United States Patent
Trovato et al.

(10) Patent No.: US 7,058,889 B2
(45) Date of Patent: Jun. 6, 2006

(54) SYNCHRONIZING TEXT/VISUAL INFORMATION WITH AUDIO PLAYBACK

(75) Inventors: Karen I. Trovato, Putnam Valley, NY (US); Dongge Li, Ossining, NY (US); Muralidharan Ramaswamy, Danbury, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 700 days.

(21) Appl. No.: 09/998,033

(22) Filed: Nov. 29, 2001

(65) Prior Publication Data

US 2002/0163533 A1 Nov. 7, 2002

Related U.S. Application Data

(60) Provisional application No. 60/278,319, filed on Mar. 23, 2001.

(51) Int. Cl.
 G06F 3/00 (2006.01)
 G06F 17/00 (2006.01)
 G10L 15/00 (2006.01)

(52) U.S. Cl. ............... 715/716; 715/717; 715/721; 715/727; 715/731; 715/864; 715/500.1; 715/512; 704/215; 704/260; 434/307 A

(58) Field of Classification Search ........... 715/716, 715/864, 700, 717, 719–721, 723, 726, 727, 715/730, 731, 740, 762, 774, 500.1, 500, 715/512, 529, 526, 530, 531; 386/66, 85, 386/88, 95, 96; 360/19, 20, 24.01, 30.01, 360/30.04, 30.08, 30.2, 47.1, 47.11, 63, 65, 360/69, 70; 434/307 A, 307 R, 308, 318; 84/461, 462, 466, 3, 4, 453, 465; 369/19, 369/20, 24.01, 30.01, 30.04, 30.08, 30.2, 369/47.1, 47.11, 63, 65, 69, 70
See application file for complete search history.

(56) References Cited

U.S. PATENT DOCUMENTS

5,453,570 A * 9/1995 Umeda et al. ....... 434/307 A X
5,648,628 A * 7/1997 Ng et al. ............. 434/307 A X
5,691,494 A * 11/1997 Sai et al. ...................... 84/609

(Continued)

FOREIGN PATENT DOCUMENTS

EP 0689362 A2 12/1995
WO 9741504 11/1997

OTHER PUBLICATIONS

D. Li et al., Classification of general audio data for content-based retrieval, Pattern Recognition Letters 22 (2001) pp. 533-544.

*Primary Examiner*—Raymond J. Bayerl
(74) *Attorney, Agent, or Firm*—Edward W. Goodman

(57) ABSTRACT

A method of synchronizing visual information with audio playback includes the steps of selecting a desired audio file from a list stored in memory associated with a display device, sending a signal from the display device to a separate playback device to cause the separate playback device to start playing the desired audio file; and displaying visual information associated with the desired audio file on the display device in accordance with timestamp data such that the visual information is displayed synchronously with the playing of the desired audio file, wherein the commencement of playing the desired audio file and the commencement of the displaying step are a function of the signal from the display device.

15 Claims, 11 Drawing Sheets

U.S. PATENT DOCUMENTS

| | | | |
|---|---|---|---|
| 5,953,005 A * | 9/1999 | Liu ........................... | 715/500.1 |
| 6,053,740 A | 4/2000 | Nakata et al. ............. | 84/609 X |
| 6,062,867 A | 5/2000 | Torimura ............. | 715/500.1 X |
| RE37,131 E | 4/2001 | Mankovitz ................ | 386/96 X |
| 6,421,645 B1 * | 7/2002 | Beigi et al. ................. | 704/272 |
| 6,600,874 B1 * | 7/2003 | Fujita et al. .................. | 386/96 |

* cited by examiner

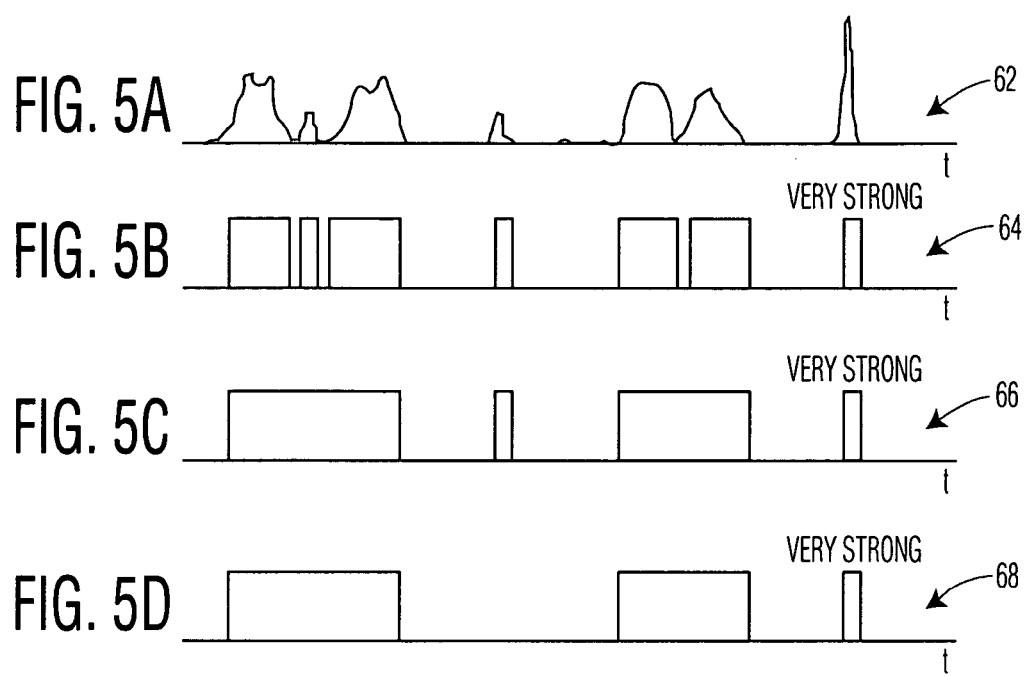

MYSONG.TXT:

THIS IS THE FIRST LINE
THIS IS THE SECOND LINE          } 100
THIS IS THE THIRD LINE
THIS IS THE FOURTH LINE          } 102

THIS IS THE FIFTH LINE
THIS IS THE SIXTH LINE
THIS IS THE SEVENTH LINE         } 102
THIS IS THE EIGHTH LINE
NOW THERE ARE SOME FINAL WORDS.

FIG. 8

110 → TIMESTAMPED_MYSONG.TXT:

```
15      THIS IS THE FIRST LINE
20      THIS IS THE SECOND LINE
25      THIS IS THE THIRD LINE       112
30      THIS IS THE FOURTH LINE
35
41      THIS IS THE FIFTH LINE
47      THIS IS THE SIXTH LINE
53      THIS IS THE SEVENTH LINE
59      THIS IS THE EIGHTH LINE
65      NOW THERE ARE SOME FINAL WORDS.
70
```

FIG. 9A

110 → TIMESTAMPED_MYSONG.TXT:

```
10      THIS IS THE FIRST LINE
5       THIS IS THE SECOND LINE
5       THIS IS THE THIRD LINE
5       THIS IS THE FOURTH LINE      112
5
6       THIS IS THE FIFTH LINE
6       THIS IS THE SIXTH LINE
6       THIS IS THE SEVENTH LINE
6       THIS IS THE EIGHTH LINE
6       NOW THERE ARE SOME FINAL WORDS.
5
```

FIG. 9B

SYNCHRONIZING TEXT/VISUAL INFORMATION WITH AUDIO PLAYBACK

CROSS REFERENCE TO RELATED APPLICATION

This application claims priority to the U.S. provisional patent application identified by Ser. No. 60/278,319, filed on Mar. 23, 2001, the disclosure of which is incorporated by reference herein.

BACKGROUND OF THE INVENTION

1. Field of the Invention

The present invention relates generally to providing timely display of the text of songs for use in Karaoke systems or the like, and more particularly, to apparatus and methods for synchronizing text and visual information with audio playback.

2. Description of the Related Art

A number of systems have the ability to illustrate the text of a song on a display device as music plays. A conventional display apparatus associated with a Karaoke system, for example, typically provides a display device that indicates the words of a song in accordance with recorded lyrics data. The lyrics data is recorded in the form of a predetermined phrase unit, the segmental position of which is adapted to change an indicated line of the words of a song to another line.

A problem with Karaoke systems is that they require expensive manual editing. Therefore, if a song is not commercially popular enough to warrant the expense of creating a text file of the words of the song, the text file of a desired song may not be available to the user. Further, Karaoke systems are typically not portable, and require large screens. In addition, the presentation of the lyrics is typically tailored to a specific display device. Thus, the words of one phrase may not be indicated on one line if lyrics data produced for use in a specific display device were used for another display device (e.g., another display device having a smaller screen).

U.S. Pat. No. 6,062,867 discloses a lyrics display apparatus wherein a display condition of the words of a song on a display device is gradually changed in accordance with a progression of a piece of music. The display condition of the lyrics is changed based on memorized production timing data of each of the song words in a predetermined amount at a predetermined time interval.

U.S. Pat. No. 6,053,740 provides a lyrics display apparatus that memorizes lyrics data including a first line-change code for defining a predetermined number of words to be indicated on one line and a second line-change code for defining a segmental position of the words indicated on the line.

Notwithstanding the advances in the art, a need still exists for an accurate and effective apparatus and method for synchronizing text or other visual information with the audio associated therewith. A further need exists for a display device that presents the words of a song synchronously with the audio version of the words, so the user can follow along.

SUMMARY OF THE INVENTION

The present invention synchronizes text or other visual information associated with audio (specifically, music) playback using audio processing technology. The invention can take available words or lyrics at the user's initiation, segment songs to define where the words apply, extract the start and end time of each segment, assign timestamp values to each segment, and present the words synchronously so the user can follow along.

The present invention finds particular applicability to Karaoke type applications, where the audio file is a song and the visual information is the text of a song. Timestamp data is assigned to correlate the visual information with the corresponding voice and non-voice segments. A display device is configured to initiate a start sequence in a separate playback device capable of playing the audio file, and display the visual information synchronously with the playing of the audio file. Furthermore, by providing the visual information output on a handheld display device, each person may have a different view, thus making translations convenient as well.

In one aspect of the invention, a method of synchronizing visual information with audio playback includes the steps of selecting a desired audio file from a list stored in a memory associated with a display device, sending a signal from the display device to a separate playback device to cause the separate playback device to start playing the desired audio file; and displaying visual information associated with the desired audio file on the display device in accordance with timestamp data such that the visual information is displayed synchronously with the playing of the desired audio file, wherein the commencement of playing the desired audio file and the commencement of the displaying step are a function of the signal from the display device.

BRIEF DESCRIPTION OF THE DRAWINGS

For a better understanding of the invention, reference is made to the following description of exemplary embodiments, and to the accompanying drawings, wherein:

FIGS. 5A–5D illustrate an audio signal at various stages of a pause detection process;

FIG. 8 illustrates the text of a sample song;

FIGS. 9A and 9B illustrate the text of a sample song along with a corresponding version of an associated timestamp file;

DESCRIPTION OF THE PREFERRED EMBODIMENTS

The present invention provides an effective method of synchronizing text or other visual information associated with audio playback using audio processing technology. According to one aspect of the invention, an audio file is segmented into voice and non non-voice segments, to improve synchronization between visual information associated with the audio file.

The following description is organized as follows. First, a background discussion is provided of various temporal and spectral domain features used in the classification of audio signals. Thereafter, a separate description is provided for each of the various processing steps performed by the audio class system 40 of FIG. 1.

More specifically, the exemplary audio class system 40 consists of a feature extraction step 42, discussed below in conjunction with FIGS. 2 and 3, a pause detection step 44, discussed below in conjunction with FIGS. 4A, 4B and 5A–5D, an audio segmentation step 46, discussed below in conjunction with FIG. 6, and an audio segment classification step 48, also discussed below in conjunction with FIG. 6.

Finally, the description is concluded with a discussion of synchronizing text and visual information with audio playback.

Temporal and Spectral Domain Feature Terminology

Figure 2:
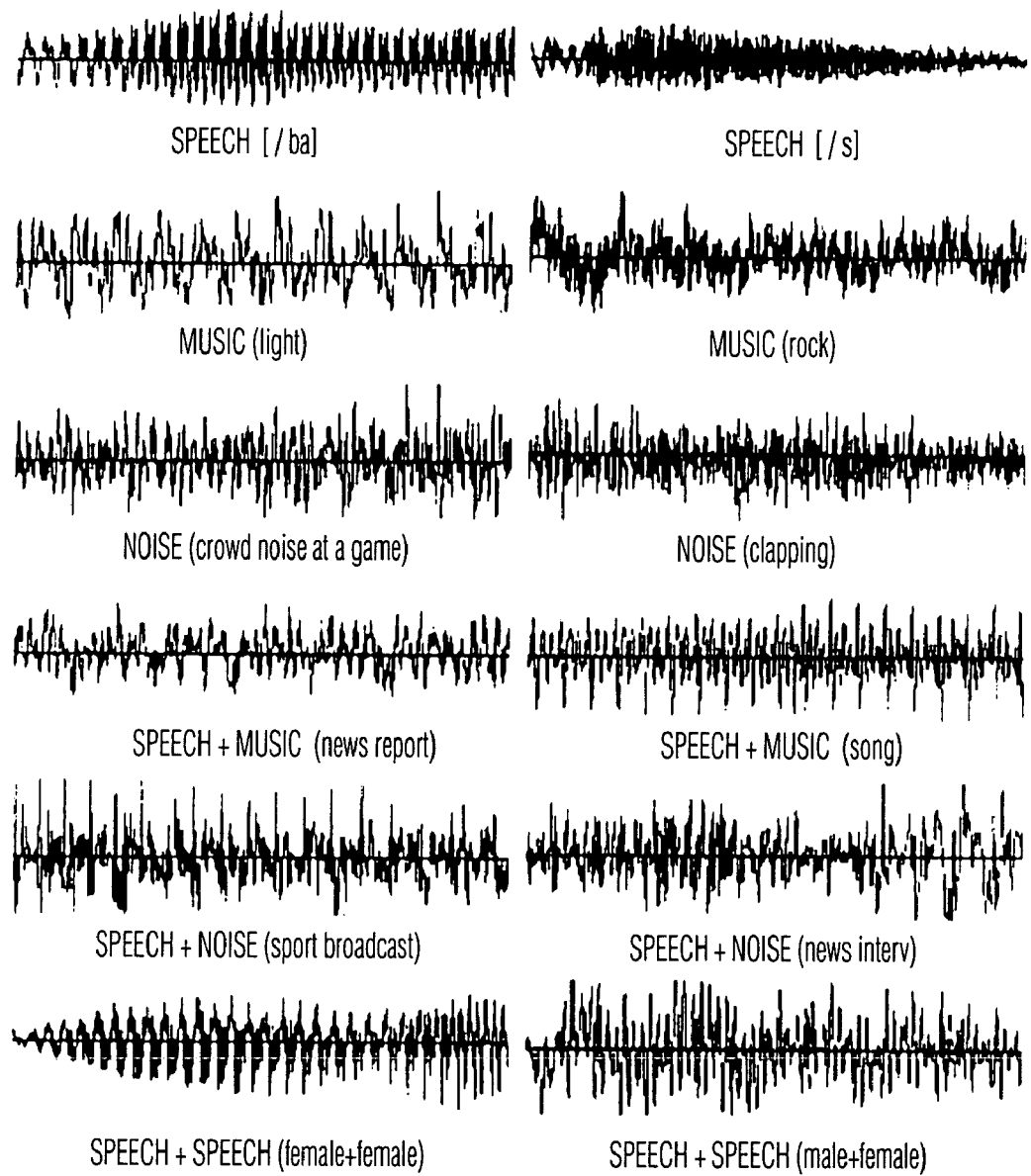
FIG. 2 illustrates waveform segments from a number of different types of audio signals.
Figure 3:
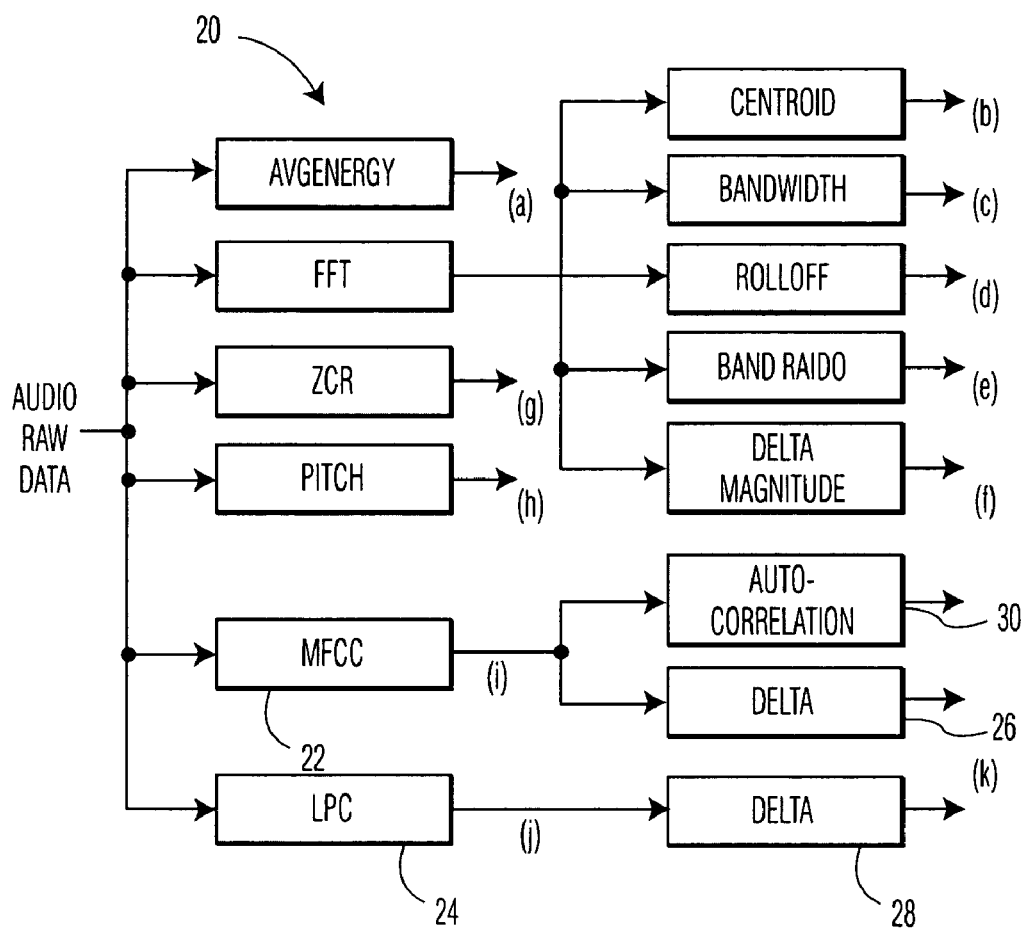
FIG. 3 is a block diagram illustrating the organization of tools for audio feature extraction.

Referring initially to FIGS. 2 and 3, the tool for calculating short-time average energy is referred to as AvgEnergy. The equation for AvgEnergy is expressed as:

$$\bar{E}_W = \frac{1}{W} \sum_i s(i)s(i)w(n-i),$$

where $$w(n) = \begin{cases} 1 & 0 < n \leq W \\ 0 & \text{otherwise} \end{cases},$$

W is the size of the processing window, and s(i) is the discrete time audio voice.

The spectral centroid, like the following several spectral features, is calculated based on the short-time Fourier transform, which is performed frame by frame along the time axis. Let $F_i = \{f_i(u)\}_{u=0}^{M}$ represent the short-time Fourier transform of the ith frame, where M is the index for the highest frequency band. The spectral centroid of frame i is calculated as:

$$c_i = \frac{\sum_{u=0}^{M} u \cdot |f_i(u)|^2}{\sum_{u=0}^{M} |f_i(u)|^2}.$$

The bandwidth of the FFT of frame i may be calculated as:

$$b_i^2 = \frac{\sum_{u=0}^{M}(u - c_i)^2 \cdot |f_i(u)|^2}{\sum_{u=0}^{M} |f_i(u)|^2}.$$

Spectral Rolloff Frequency (SRF) is normally very high for low-energy, unvoiced speech segments and much lower for speech segments with relatively higher energy. Music and noise, however, do not have a similar property, which makes this feature potentially useful for discrimination between speech and other types of audio voices. The definition of SRF is given as:

$$SRF_i = \max\left(h \left| \sum_{u=0}^{n} f_i(u) < TH \cdot \sum_{u=0}^{M} f_i(u) \right| \right),$$

where TH is a threshold between 0 and 1.

Although band energy ratio (BER) may be defined in different ways, there is essentially not much difference between the various definitions. BER is calculated as:

$$BER_i = \frac{\sum_{u=0}^{h} f_i(u)}{\sum_{u=0}^{M} f_i(u)},$$

where h=M/4.

Delta spectrum magnitude is a very suitable feature for a speech/music discriminator. It is given as:

$$\Delta F_i = \sum_{u=0}^{M} |||f_i(u)| - |f_{i+1}(u)|||$$

Zero-Crossing Rate (ZCR) is a correlation of the spectral centroid. It is defined as the number of time-domain zero-crossings within the processing window.

The knowledge of pitch contour is used in many applications, such as speaker identification, speech analysis, and audio information retrieval. Among the many available pitch detection algorithms, the classical autocorrelation-based pitch tracker will be utilized due to its robustness. To avoid most of the unnecessary time-consuming autocorrelation calculations and to optimize the detection accuracy, a series of modification strategies are adopted in the pitch detection approach.

Various combinations of thirteen temporal and spectral features using several classification strategies have been evaluated. These evaluations report a classification accuracy of over 90% for a two-way speech/music discriminator, but only about 65% for a three-way classifier that uses the same set of features to discriminate speech, music, and simultaneous speech and music. Cepstral-based features, which are widely used in the speech recognition domain, have also been investigated. Autocorrelation of the Mel-cepstral (AC- Mel) parameters are suggested as suitable features for the classification of stress conditions in speech. Using fourteen mel-frequency cepstral coefficients (MFCC), audio data may be classified into seven categories. The categories are: studio speech, field speech, speech with background music, noisy speech, music, silence, and garbage, which covers the rest of audio patterns.

Audio classification system 40 processes an audio signal to separate the audio signal into segments of various categories. The seven audio categories for continuous GAD used in conjunction with the present invention system, consist of silence, single speaker speech, music, environmental noise, multiple speakers' speech, simultaneous speech and music, and speech and noise. The environmental noise category refers to noise without foreground sound. The simultaneous speech and music category includes both singing and speech with background music. Exemplary waveforms for the seven categories of GAD considered by the present invention (other than silence) are shown in FIG. 2.

To facilitate an easily reusable and expandable design, and to make the task of feature evaluation easier, an auditory toolbox 20, illustrated in FIG. 3, was developed. The auditory toolbox 20 may have more than two dozen tools. Each tool is responsible for a single basic operation that is frequently needed during the analysis of audio data. By using the toolbox 20, many of the troublesome tasks related to the processing of streamed audio data, such as buffer management and optimization, synchronization between different processing procedures, and exception handling, become transparent to users. Operations that are currently implemented in the toolbox 20 include frequency-domain operations, temporal-domain operations, and basic mathematical operations, such as short-time averaging, log operations, windowing and clipping. Since a common communication agreement is defined among all of the tools, the results from one tool can be shared with other types of tools without any limitation. Tools within the toolbox can thus be organized in a very flexible way to accommodate various applications and requirements.

Feature Extraction 42

Figure 1:
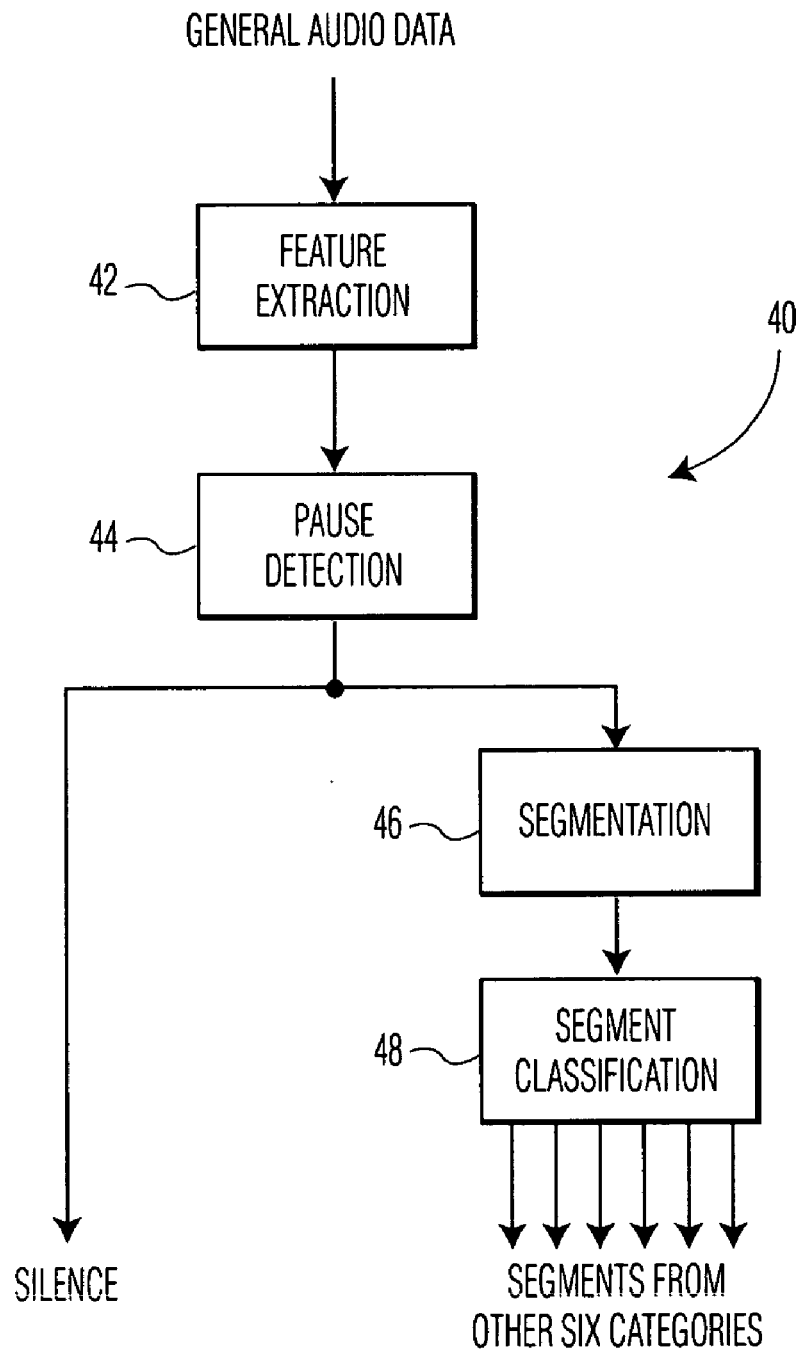
FIG. 1 is a block diagram illustrating the classification of general audio data.

FIG. 3 illustrates an exemplary arrangement of tools used for the extraction of six sets of acoustical features during the feature extraction step 42 (FIG. 1). This arrangement of tools includes MFCC 22, Linear Prediction Coefficients (LPC) 24, delta MFCC 26, delta LPC 28, autocorrelation MFCC 30, and several temporal and spectral features. It is noted that the acoustical features that are used in the succeeding three steps 44, 46, 48 are extracted frame by frame along the time axis from the input audio raw data.

The MFCCs 22 are extracted using the discrete cosine transform (DCT) of filter-banked fast Fourier transform (FFT) spectra. The calculations are performed frame by frame on the windowed input data along the time axis. Several types of windows are available including square and Hamming windows.

The extraction of LPCs 24 is implemented using the autocorrelation method. At each processing step, twelve coefficients are extracted.

The Delta MFCC 26, Delta LPC 28, and autocorrelation MFCC 30 features provide quantitative measures to the movement of the MFCC 22 or LPC 24. They have been adopted in some applications in the speech domain. The definitions for these features are given as follows:

$$\Delta MFCC_i(v) = MFCC_{i+1}(v) - MFCC_i(v),$$

$$\Delta LPC_i(v) = LPC_{i+1}(v) - LPC_i(v),$$

$$ACMFCC_i^{(1)}(v) = \frac{1}{L} \sum_{j=i}^{i+L} (MFCC_j(v) \cdot MFCC_{j+1}(v)),$$

where $MFCC_i(v)$ and $LPC_i(v)$ represent the vth MFCC and LPC of frame i, respectively. L is the correlation window length. The superscript l is the value of correlation lag.

Based on the above acoustical features, many more features that are used in the classification of audio segments can be further extracted by analyzing acoustical features of adjacent frames.

According to experimental results, these features, which correspond to the characteristics of audio data over a longer term, e.g., 600 ms, are more suitable for the classification of audio segments. The features used for audio segment classification include: (i) the means and variances of acoustical features over a certain number of successive frames centered on the frame of interest; (ii) pause rate (the ratio between the number of frames with energy lower than a threshold and the total number of frames being considered); (iii) harmonicity (the ratio between the number of frames with a valid pitch value and the total number of frames being considered); and (iv) summations of energy of MFCC, delta MFCC, autocorrelation MFCC, LPC and delta LPC.

Pause Detection 44

Pause detection 44 is responsible for separating the input audio clip into non-voice segments and voice segments. Here, the pause means a time period that is judged by a listener to be a period of absence of sound, other than one caused by a stop consonant or a slight hesitation. It is thus very important for a pause detector to generate results that are consistent with the perception of human beings.

Figure 4A:
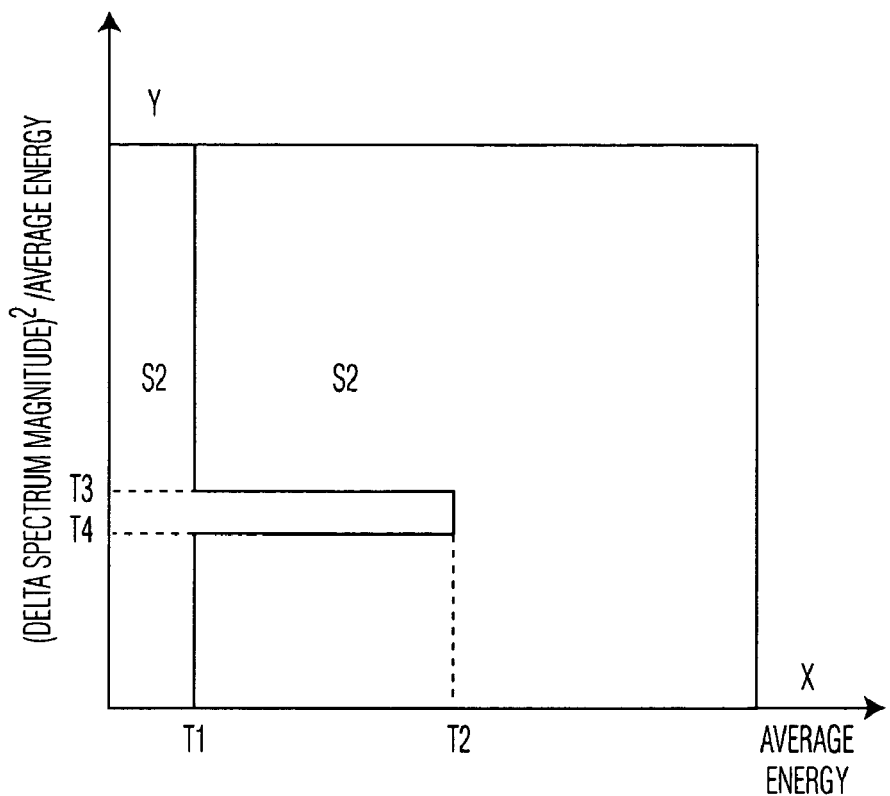
FIG. 4A is a chart illustrating two-dimensional partitioned space.
Figure 4B:
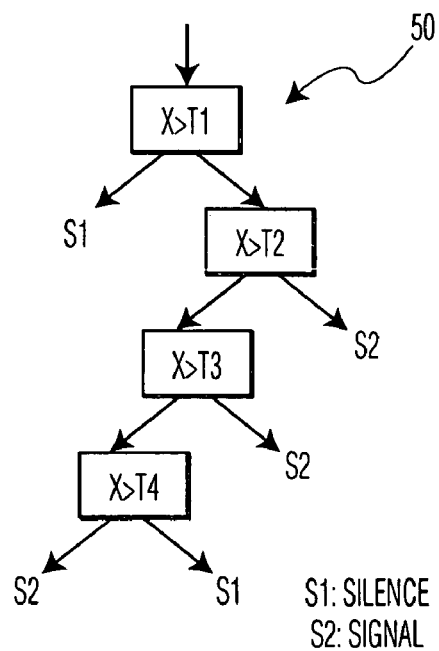
FIG. 4B is a block diagram illustrating a decision tree corresponding to FIG. 4A.

A three-step procedure can be implemented during step 44 for the detection of pause periods from GAD. Specifically, the exemplary pause detection process 44 consists of (i) partitioning each frame of audio data as a voice or a pause, followed by (ii) a fill-in process, and (iii) a throwaway process. Based on the features extracted by the toolbox during step 42, the input audio data is first marked frame-by-frame as a voice or a pause frame to obtain raw boundaries. The frame-by-frame classification may be done using a decision tree algorithm illustrated in FIG. 4B. The decision tree is obtained based on the hierarchical feature space partitioning method. In FIGS. 4A and 4B, the partitioning result for a two-dimensional feature space and its corresponding decision tree for pause detection are illustrated. Since the results obtained in the first step are usually sensitive to unvoiced speech and slight hesitations, a fill-in process and a throwaway process are then applied in the succeeding two steps to generate results that are more consistent with the human perception of pause.

During the fill-in process, a pause segment, that is, a continuous sequence of pause frames, with a length less than a fill-in threshold is relabeled as a voice segment and is merged with the neighboring voice segments. During the throwaway process, a segment labeled voice with a strength value smaller than a threshold strength value is relabeled as a non-voice segment. The strength of a voice segment is defined as:

$$\text{Strength} = \max\left(L, \sum_{i}^{L} \frac{s(i)}{T_1}\right),$$

where L is the length of the voice segment and $T_1$ corresponds to the lowest voice level shown in FIG. 4A. The basic idea of defining segment strength, instead of using the length of the segment directly is to take voice energy into account so that segments of transient sound bursts will not be relabeled as non-voice during the throwaway process.

FIGS. 5A–5D illustrate the three steps of the pause detection algorithm. Four different line charts are illustrated in FIGS. 5A–5D. In FIG. 5A, chart 62 illustrates the raw audio input signal as it is received from the source. In FIG. 5B, chart 64 illustrates a normalized version of the raw data wherein sections of strong audio signals are represented by a square wave. In chart 66, shown in FIG. 5C, the square waves were evaluated as a whole and adjacent squares with minimal separation were combined. Next, proceeding from chart 66 to 68 (FIG. 5D), the strength of each particular audio signal was evaluated and the one peak in the center of chart 66 was eliminated since the audio signal was weak.

As described above, the pause detection stage 44 yields two kinds of segments: voice and non-voice. The non-voice segments do not need any further processing because they are already classified. The voice segments, however, need additional processing to mark the transition points, i.e., locations where the category of the underlying signal changes, before classification.

Segmentation 46

To locate transition points, the segmentation scheme 46 uses a process of two successive steps: break detection and break merging. During the break detection step, a large detection window over the voice segment is moved and the average energy of different halves of the window at each sliding position is compared. This permits detection of two types of breaks:

$$\begin{cases} \text{Onset break: if } \overline{E}_2 - \overline{E}_1 > Th_1 \\ \text{Offset break: if } \overline{E}_1 - \overline{E}_2 > Th_2 \end{cases},$$

where $\overline{E}_1$ and $\overline{E}_2$ are average energy of the first and the second halves of the detection window, respectively. The onset break indicates a potential change in audio category because of increased signal energy. Similarly, the offset break implies a change in the category of the underlying signal because of lowering of energy. Since the break detection window is slid along the signal, a single transition in the audio category of the underlying signal can generate several consecutive breaks. The merger of such a series of breaks is accomplished during the second step of the segmentation process. During this step, adjacent breaks of the same type are merged into a single break. An offset break is also merged with its immediately following onset break, provided the two are close to each other. This is done to bridge any small gap between the end of one signal and the beginning of another signal.

Figures 6, 7:
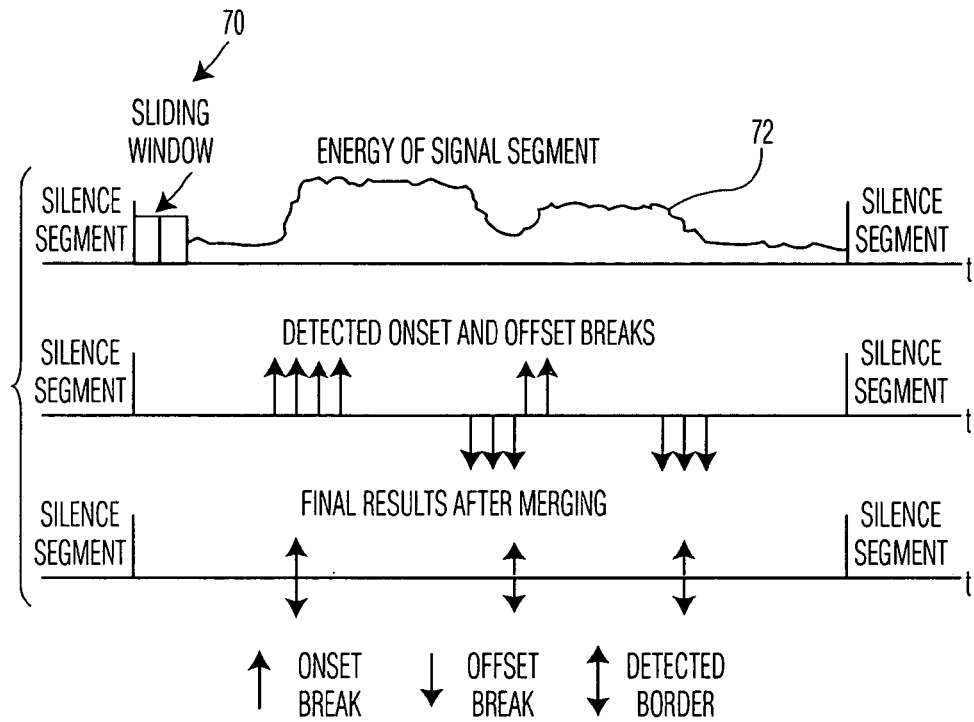
FIG. 6 illustrates the segmentation process in accordance with the present invention.
FIG. 7 is a graphical representation of speech and non-speech portions of a song.

FIG. 6 provides an illustration of the segmentation process 46 through the detection and merger of signal breaks.

The classifier parses a continuous bit-stream of audio data into different non-overlapping segments such that each segment is homogenous in terms of its class. A segmentation-pooling scheme is an effective way to reduce the border effect and to generate classification results that are consistent with human perception. Since the transition of audio from one category into another can cause classification errors, the segmentation-pooling scheme provides an effective way to reduce such errors. The segmentation part of the segmentation-pooling scheme is used to locate the boundaries in the voice segments where a transition from one type of audio to another type is taking place. This part uses the onset and offset measures, which indicate how fast the voice is changing, to locate boundaries in the voice segments of the input. The result of the segmentation processing 46 is to yield smaller homogeneous voice segments. The pooling component of the segmentation-pooling scheme is used at the time of classification 48. It involves pooling of the frame-by-frame classification results to classify a segmented voice segment.

Audio Segment Classification 48

In order to classify an audio segment, first each and every frame of the segment is classified. The frames are defined by a sliding window 70 which is gradually moved along the energy waveform 72 created by the signal, as shown in FIG. 6. Next, the frame classification results are integrated to arrive at a classification label for the entire segment. The integration is performed by a pooling process which counts the number of frames assigned to each audio category. The category most heavily represented in the counting is taken as the audio classification label for the segment. The features used to classify a frame not only come from that frame but also from other frames as mentioned above. The classification is performed using a Bayesian classifier under the assumption that each category has a multidimensional Gaussian distribution. The classification rule for frame classification can be expressed as:

$$c^* = \arg\min_{c=1,2,\ldots,C} \{D^2(x, m_c, S_c) + \ln(\det S_c) - 2\ln(p_c)\},$$

where C is the total number of candidate categories (in this example, C is 6). However, in a preferred embodiment, the total number of candidate categories is two. The first represents "voice" (words or singing). The second is "not voice" (any signal other than voice such as instrumental, noise, silence, etc.). $c^*$ is the classification result, x is the feature vector of the frame being analyzed. The quantities $m_c$, $S_c$, and $p_c$ represent the mean vector, covariance matrix, and probability of class c, respectively, and $D^2(x, m_c, S_c)$ represents the Mahalanobis distance between x and $m_c$. Since $m_c$, $S_c$, and $p_c$ are unknown, these are determined using the maximum a posteriori (MAP) estimator.

The classification algorithm uses a minimum increment of time (e.g., second) to define the most likely classification. This reduces the number of transient classifications that could possibly occur with shorter increments. In essence, the classification algorithm is a smoothing function.

Speech mapping is the process whereby the input text is mapped over the identified speech-segments. The text is ideally available with an extra blank line where the major pauses occur, such as at the end of each verse. In the example of FIG. 7, there are two speech segments, S1 and S2. The user has entered the text 100 as in FIG. 8, with a blank line 102 showing the end of each verse. The words will then be time-stamped as in FIG. 9A or 9B, as will be described in further detail below.

In the simplest case, the number of "paragraphs" will match the "has-speech" sections of the song, as illustrated in FIG. 7. Thus, the "timestamps" for viewing each of the lines within the verse will be provided in a linear fashion. The timestamp denoting changes in classification will define the end of one category and the beginning of another. At the end of the song, it is desirable to have a timestamp with a blank text or a textual indicator such as, e.g., "~the end~," to clear displaying screens. If the text is entered without blank lines, then the text is distributed linearly over the available speech-segments.

Exemplary timestamp files are illustrated in FIGS. 9A and 9B. The timestamps 110 (commonly measured in seconds) of FIGS. 9A and 9B are illustrated to the left of the text 112 of the song.

The timestamps 110 in FIG. 9A are shown as actual elapsed time. That is, since the first timestamp value is fifteen (15), at fifteen seconds after the start of Mysong, the first line of text will be displayed. The first line will be displayed for five seconds, i.e., from an elapsed time of fifteen seconds to an elapsed time of twenty seconds. When the elapsed time equals twenty (20) seconds, the second line of text will be displayed. The remaining lines of the song will be displayed sequentially according to the remaining timestamp values.

In an alternative embodiment, the timestamps 110 in FIG. 9B are illustrated as delay (dwell) times. Although the results will be the same, in this case there is a blank line displayed for ten seconds and then the display of the first line of text is delayed for five seconds. For systems that operate with a "display, then delay" loop, the times are better computed as delays so they can be used immediately.

The timing of the display of the text will be different depending upon the capabilities of the display unit. That is, if a verse is too long, or the screen length is too short, then a full screen cannot be displayed, and the 'accumulated delay' (i.e., the sum of the delays) is now equal to the amount of time delayed before proceeding to the next page if the words are presented in a full page at a time.

Figure 10:
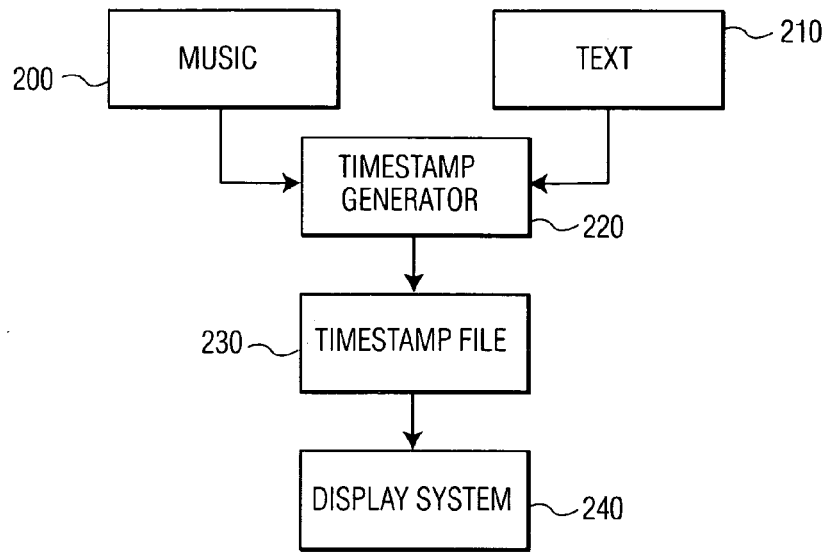
FIG. 10 is a flow diagram illustrating a general overview of the timestamp generation process in accordance with the present invention.

Several techniques may be employed to determine the timestamp information in accordance with the present invention. Referring initially to FIG. 10, there is shown a flow diagram illustrating a general overview of a timestamp generation process in accordance with the present invention.

There are two basic activities associated with generating a timestamp file. The first is to retrieve the music 200 and segment it into relevant categories. The second is to retrieve the text 210 associated with music 200 and optionally pattern the text. The music 200 is then matched to the text 210 via timestamp generator 220 to form a timestamp file 230. The timestamp file 230 can be generated once, and then optionally shared with other users (e.g., via the Internet). The timestamp file 230 is loaded into a device having a display, referred to herein as display system 240.

When a song is selected, the display system 240 displays the text 210 in synchronization with the music 200. The display system 240 may be, for example, the Pronto™ display, which is manufactured by Philips Electronics. The Pronto™ transmits an infrared radiation (IR) command to synchronously start the display sequence along with the music and text. The synchronous start capability permits control of a separate, pre-existing playback device, such as, for example, a compact disk (CD) player, but with the words displayed on the Pronto™. This is advantageous because the synchronous display of the text may be achieved without purchasing a new playing system.

There are many means for providing the text of music to the timestamp generation process. Preferably, a text file of words is provided. The means to deliver the text include delivery mechanisms to read data, manual entry, transfer by network, wireless transmission, removable storage technology and other means known to one having ordinary skill in the art. For example, lyrics may be delivered by reading and storing lyrics from data tracks on CD-ROM, data delivered via RDS FM subcarrier, pager, embedded in digital television transmissions, data retrieved from the Internet, data typed manually by a person listening to the music, by transfer of data via removable media, such as SmartMedia, CompactFlash memory cards or memory sticks.

Timestamp generation can be as simple as assigning each word a timestamp value based on the total duration of the sentence or paragraph. As more characterizing information becomes available, this process can also provide more accurate timestamp information.

Complicated applications of the timestamp process in accordance with present invention, such as the analysis of musical lyrics, are preferably performed on computers. Simple timestamp generation does not require a computer. The results may then be posted and shared on a server via an Internet service provider.

Parsing and text segmentation are two techniques that may be used to segment lyrics into sentences or paragraphs according to various indicators, such as, e.g., different symbols or spaces between words. Alternatively, a syntax mechanism, such as is used in compiler technology, may be used to map the paragraphs to the classification-timestamps. This would allow the use of punctuation to guide the timing further.

It is also contemplated that with an inexpensive integrated circuit chip to support it, the timestamp generation process may also be performed directly by music players.

Figure 11:
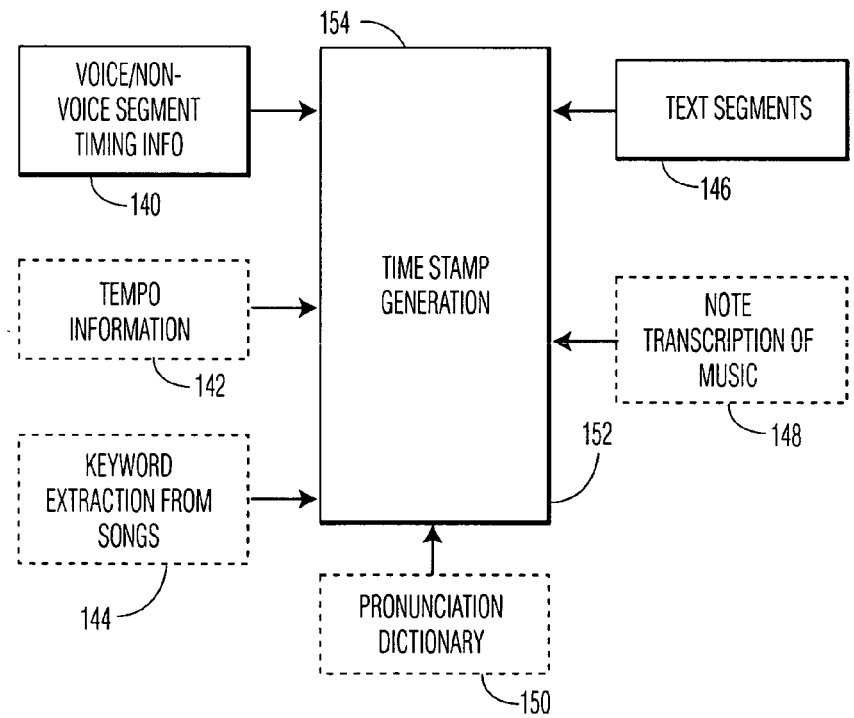
FIG. 11 is a block diagram illustrating various input elements that may be used as a basis for performing a timestamp generation process in accordance with the present invention.

Referring now to FIG. 11, a flow diagram illustrating various methods that may be used as a basis for performing the timestamp generation process 154 in accordance with the present invention is shown.

When using only text segments 146 and voice/non-voice segment timing information 140, the algorithm for determining the timestamp values may be expressed as follows:

$$T_i = S + \frac{(S-E) \cdot i}{N}$$

where $T_i$ is the timestamp for word i in the segment for which timestamps are being generated; S and E are the start and end times for the segments that are obtained from a music analysis; and N is the total number of words in the segment.

The pronunciation dictionary segment 150 allows the timestamp values to be generated more accurately by counting the number of syllables instead of words. In that case, N is the total number of syllables and i is the number of syllables before the current word.

Utilizing the note transcription of music segment 148 allows the timestamp values to be generated more accurately by counting the number of full notes that have passed from the beginning of the segment (only counting the full note itself will not be accurate since the notes do not normally represent the introduction and transition of music segments i.e., those segments of music without voice), which can change greatly from version to version. Therefore, in this case, N becomes the number of full notes in the segment and i is the number of full notes before the current word.

With the assistance of automatic speech recognition software (ASR), it is possible to detect keywords that appear in the music.

The tempo and keyword techniques 142 and 144, respectively, may be used to verify and revise the results obtained above utilizing other methods. For instance, the tempo and full notes methods can detect how long the voice segments can take and the remaining segments are assumed to be non-voice segments.

Use of a particular method is optional and depends on the application requirements and resource availability. For instance, when implementing the timestamp generation process 154 on a small chip, it is preferred that a simple algorithm is utilized and that the methods 142, 144, 148, 150 illustrated in dashed boxes are not required. However, if resource availability is not a concern and the goal is to generate information as accurately as possible (e.g., for an Internet service provider or for automatically generating commercial Karaoke compact disks) methods 142, 144, 148 and 150 may be required.

Figure 12:
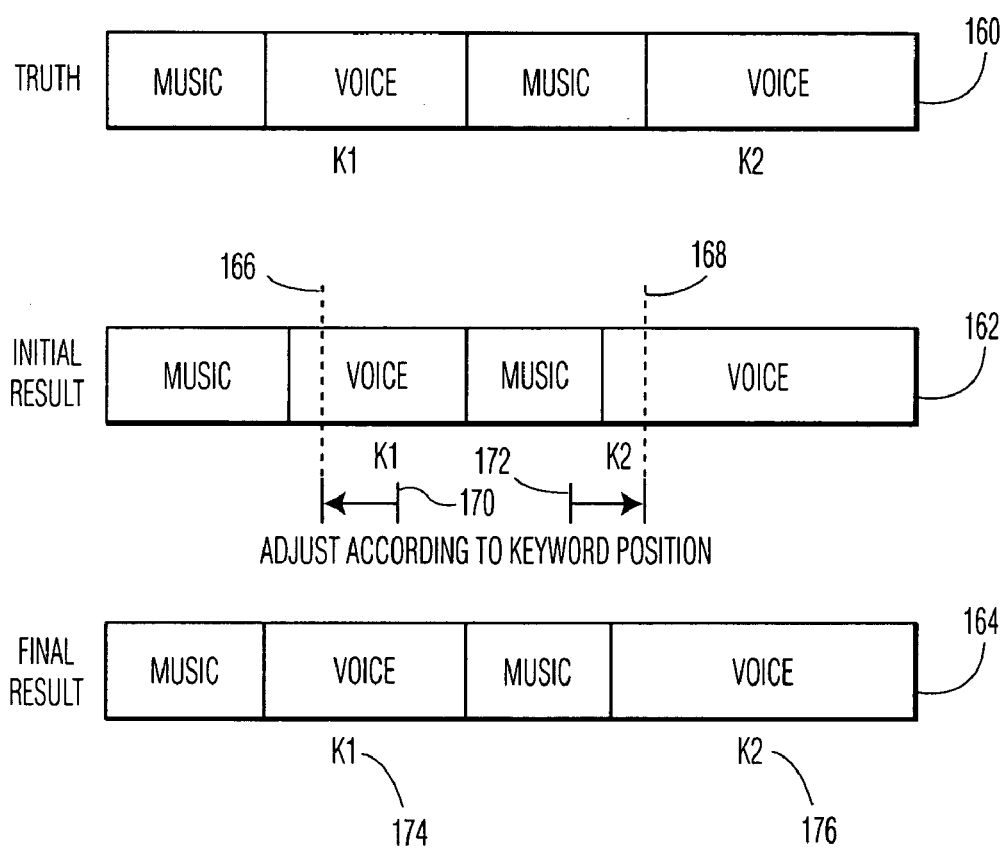
FIG. 12 is a graphical representation illustrating an adjustment to timestamp values.

FIG. 12 illustrates a method for refining the timestamp data to ensure that it corresponds with the actual words of a song. As shown, the keyword locations which are extracted from the song in accordance with method 144 illustrated in FIG. 11 are checked to determine whether they correspond to actual keyword locations in the transcript. If the keyword location in the timestamp data does not accurately match the actual location of the keyword in the transcript, the timestamp data may be shifted accordingly.

More specifically, FIG. 12 illustrates three bars that indicate music/voice (also referred to herein as non-speech/speech) segments of a song. Bar 160 simply refers to the raw data of the song being analyzed. Bar 162 illustrates the mismatch between the actual keyword location and the keyword position extracted by the timestamp generation process. The actual locations of keywords K1 and K2 are illustrated by the dashed vertical lines 166 and 168, respectively. Vertical lines 170 and 172 illustrate the locations of the keywords K1 and K2 according to the timestamp data. Thus, to improve the accuracy of the timestamp data, the locations of keywords K1 and K2 must be adjusted in the directions of the arrows illustrated in FIG. 12 with reference to bar 162. Bar 164 illustrates the final result of the adjustment process. Thus, the timestamp data for keywords K1 and K2 correspond to the actual K1 and K2 positions identified as 174 and 176, respectively.

Once there are accurate timestamps associated with each portion of text, a handheld display system, such as the Pronto™, can display the text at the appropriate time.

The text may be displayed on a screen in a variety of fashions, to improve readability, aesthetics, or entertainment. For example, sentences may be word-wrapped so that they are easier to display, text may be overwritten as new lines appear, or the screen may be cleared every N lines, depending on the screen size. There are also ways to word-wrap text from the bottom of the screen to the top. For example, the screen may be split into two halves, top and bottom, that are alternately refreshed. This allows the viewer to see the end of the previous half-page, while viewing the current half-page. Although it is possible to have a moving scroll of text, this is often difficult to read on displays.

It is also contemplated that, in songs having lyrics sung by both a male and a female, a distinction may be made between the particular words that are sung by a male and those that are sung by the female. Thus, upon display of the lyrics, an indication, such as a font or color change, may be made on the display device to alert the male or female about when it is his or her turn to sing (e.g., in a Karaoke situation).

Alternatively, logical pauses (such as after a period or comma) may have a "newline" (or carriage return) character appended automatically. For a period, two newlines may be entered to indicate the end of a sentence, which for songwriting is also often the end of a verse. In parser technology, such formatting may be detected, thereby facilitating the correct insertions and formatting.

Non-word items (such as pictures) may also be provided for display. Non-word items will be appropriately displayed based on the timing of the rest of the text. Alternatively, if special detection is available (such as drum detection) then special non-word identifiers (e.g., a picture or animation of a drum) or specialized phrases such as "drum solo" may be displayed.

Further, words may have special sounds, pictures, animations or videos interspersed with them. These special "non-word" items may be generated as part of the formatting so that every time a "key word" is detected, a particular item may be inserted. For example, whenever the word "girl" is used, a picture of a girl is shown in time with the word. The non-word item may replace the key word or may be displayed in addition to the word.

Many other presentation methods may be envisioned by one having ordinary skill in the art.

Figure 13:
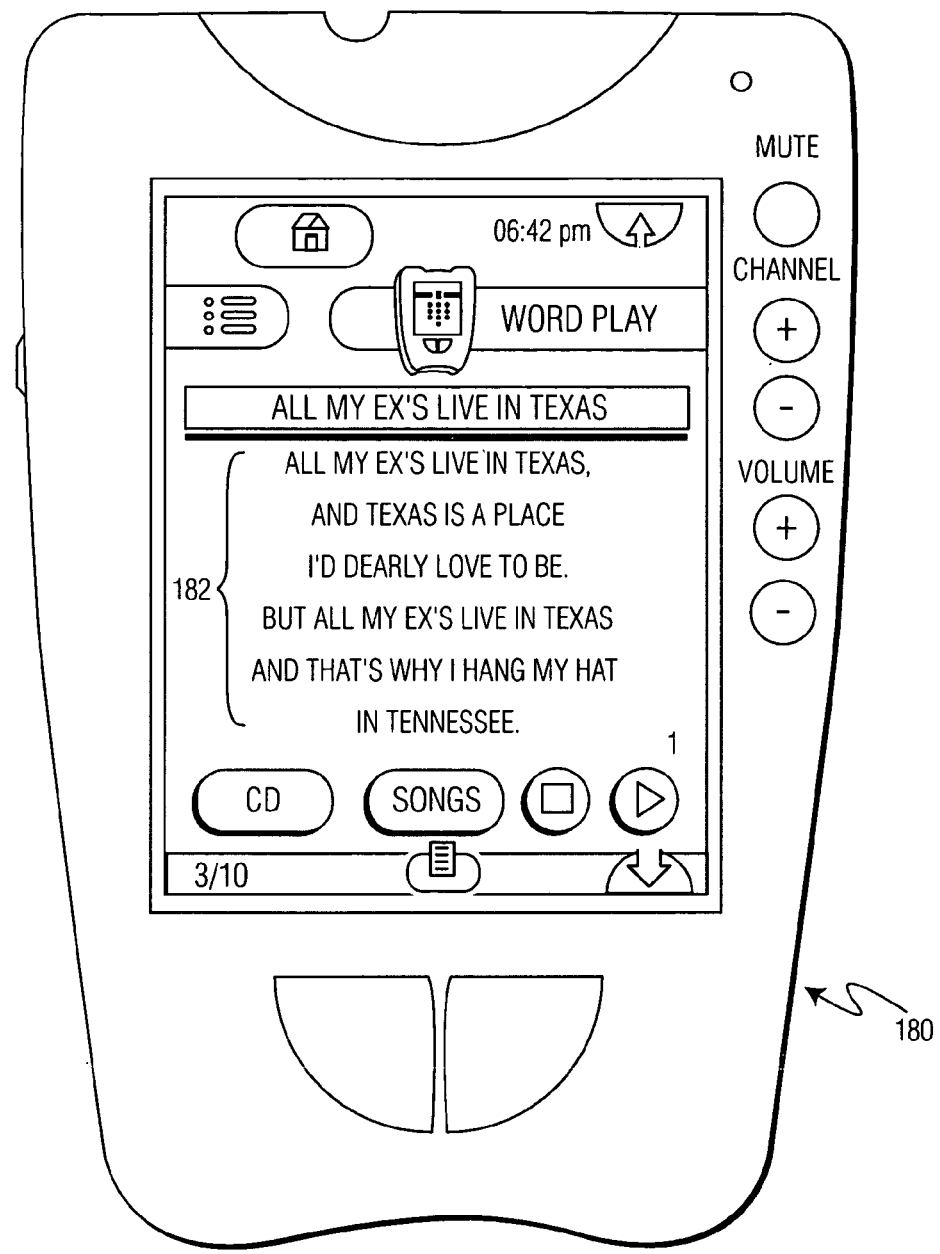
FIG. 13 illustrates a handheld display device for use in accordance with the present invention.

As shown in FIG. 13, the Philips Pronto™ display 180 is capable of displaying six lines of text 182. Therefore, for the Pronto™, a full verse at a time may be displayed. Blank lines fill the end of the screen.

Utilization of handheld display devices, such as the Pronto™ display, makes it possible to display the text of a song on multiple devices in a synchronous manner to permit two or more people to follow the text of the audio. In this embodiment, each synchronized device may receive a "go" message from a device that is operating as a server. Alternatively, the server may send the text and timing to all other synchronized devices, dynamically, so that the other synchronized devices do not have to store the text, thereby saving valuable memory space.

Figure 14:
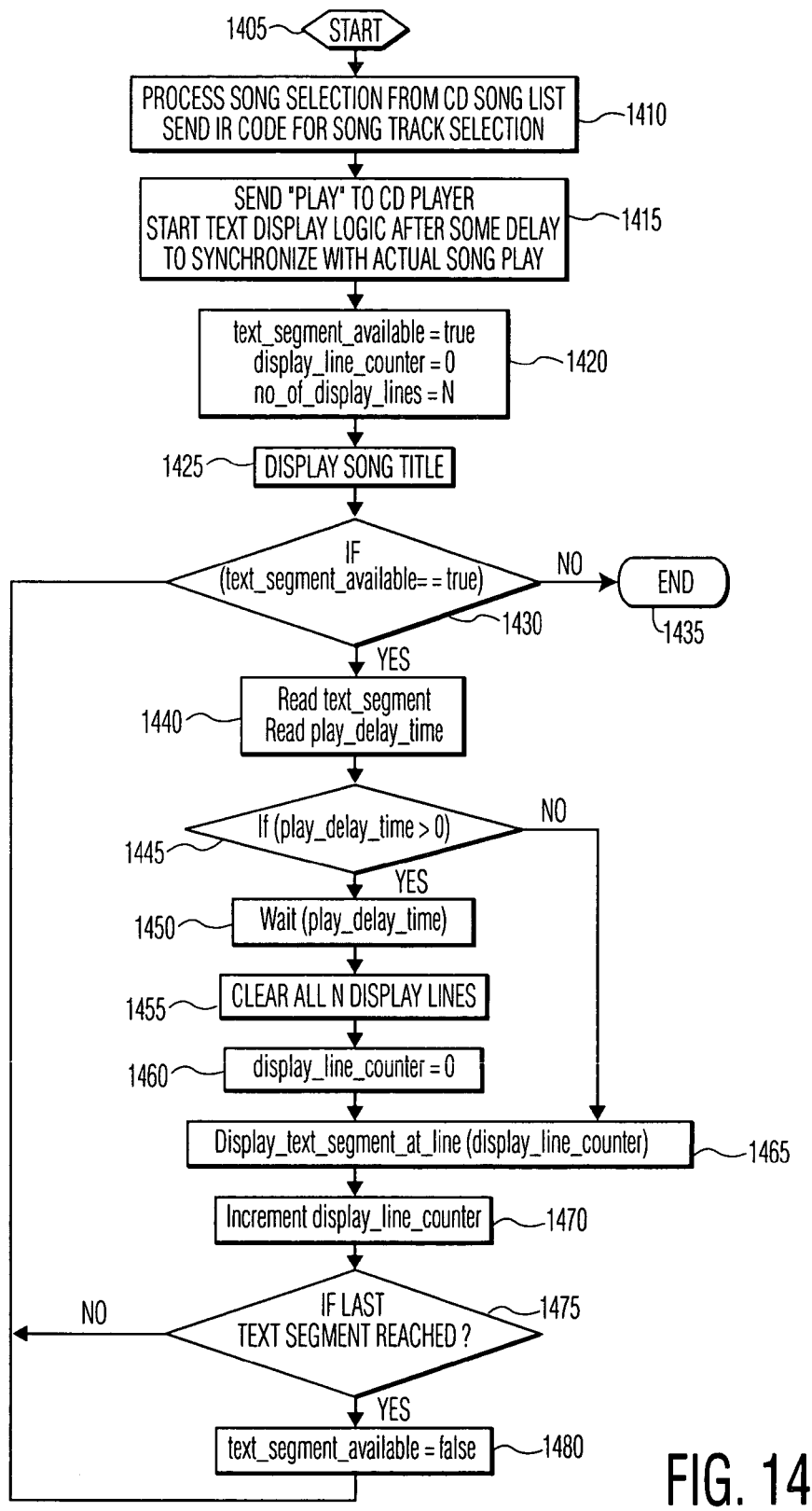
FIG. 14 is a flow diagram illustrating a method of synchronizing text and/or visual information with audio playback in accordance with the present invention.

Referring now to FIG. 14, a flow diagram is shown illustrating a method of synchronizing text and/or visual information with audio playback in accordance with the present invention. In step 1405, the user selects a song title from a list of songs stored within memory in the handheld display device. The selection may be transferred from the user to the handheld display device via, for example, the depression of a button or by a touch-sensitive screen. Alternatively, it is also contemplated that the user may select "random" as the selection, whereupon the system will select random songs within the set of known songs. The random selection may use a random number generator to select different songs, one at a time. This may substitute for the user's input at this step until the user stops or resets the system.

A processor within the handheld display device processes the request from the user and sends a signal (e.g., an infrared signal) to a separate playback device. The signal instructs the separate playback device to tune to the desired audio track corresponding to the desired song chosen by the user. Alternatively, if the separate playback device does not have the ability to tune to a specific desired audio track automatically (e.g., proceed to track 5), then the handheld display device will send a signal to the separate playback device to reset the separate playback device. That is, the separate playback device will be instructed to shut down, restart, and then count up to the desired track. This step ensures that the separate playback device is synchronized with the handheld display device.

It is contemplated that one or more files may be loaded onto and stored in a single handheld display device. The handheld display device will have the capability to sort the files by name, classification, subject, date or other criteria. Loading of the files into the handheld display device may occur by docking the handheld display device or otherwise communicating via wire or wireless technology as is known to one having ordinary skill in the art.

Once the separate playback device arrives at the desired track, a play signal is sent by the handheld display device to have the separate playback device actually start playing the selected song. As indicated in step 1415, after a brief delay to permit the separate playback device to actually start playing the selected song, the handheld display device will begin displaying text synchronously with the audio version being played on the separate playback device.

Step 1420 is an initialization step wherein the handheld display device is checked to determine whether there are any text lines available to be displayed, the display line counter is set to zero, and the number of display lines is set to N. Next, in step 1425, the title of the desired song is displayed.

In step 1430, a check is made for the existence of additional text segments. If no additional text segments exist for display purposes, the method is ended, as indicated by step 1435. If there are additional text segments to be displayed, the method proceeds to step 1440 wherein the text segment and the associated delay time (timestamp) are read. In steps 1445 and 1450, if the delay time is greater than zero, the method will wait while the delay time is run. During this delay time, the text will be displayed on the screen of the display device.

Once the delay time has elapsed, all of the display lines will be cleared from the screen and a display line counter will be reset to zero, as indicated by steps 1455 and 1460, respectively.

If the delay time is equal to zero in step 1445, the method will proceed directly to steps 1465 and 1470 wherein the line counter is displayed and incremented.

Finally, in step 1475, a determination is made as to whether the last text segment has been reached. If the last text segment has been reached, the method proceeds to step 1480 which indicates that there is no more text available. From step 1480, the method performs another check to determine whether text is available in step 1430. Since no additional text is available, the answer to the question in step 1430 is no and the method will end at step 1435.

If, instead, the last text segment has not been reached, and, therefore, the answer to the question posed in step 1475 is no, the method will commence again beginning at step 1430.

Although the illustrative embodiments of the present invention have been described herein with reference to the accompanying drawings, it is to be understood that the invention is not limited to those precise embodiments, and that various other changes and modifications may be affected therein by one having ordinary skill in the art without departing from the scope or spirit of the invention. For example, features such as a marker (e.g., a bouncing ball or musical note) may be added to the display to indicate the current place in the text, or the text could be displayed in a variety of languages. Additionally, the time-stamped text may be made available for other users, such as, e.g., on the Internet. All such changes and modifications are intended to be included within the scope of the invention as defined by the appended claims.

The invention claimed is:

1. A method of synchronizing visual information with audio playback, comprising the steps of;

receiving a user selection of a desired audio file;

initiating play of the desired audio file on an audio playback device; and displaying visual information associated with the desired audio file on a display device separate from said audio playback device in accordance with timestamp data such that the visual information is displayed synchronously with the playing of the desired audio file, wherein the commencement of playing the desired audio file by the audio playback device and the commencement of the displaying step by the display device are a function of a signal from the display device, said signal turning the audio playback device off and on prior to the audio playback device playing the desired audio file.

2. The method as claimed in claim 1, wherein the signal comprises an infrared signal.

3. The method as claimed in claim 1, wherein the display device comprises a handheld device.

4. The method as claimed in claim 1, wherein said method further comprises the step of:

analyzing the audio file and generating timestamp data corresponding to the visual information associated with the audio file.

5. The method as claimed in claim 4, wherein the timestamp data is generated utilizing tempo information extracted from music.

6. The method as claimed in claim 1, wherein the visual information comprises text lines.

7. The method as claimed in claim 1, wherein said method further comprises the step of:

displaying a title of the desired audio file on the display device.

8. The method as claimed in claim 1, wherein the selection is from a list stored in a memory associated with the display device.

9. The method as claimed in claim 1, wherein the selection is performed by a random number selection method.

10. The method as claimed in claim 1, wherein said method further comprises the step of:

sending a signal from the display device to the audio playback device to cause the audio playback device to start.

11. A method of synchronizing visual information with audio playback, comprising the steps of:

receiving a user selection of a desired audio file;

analyzing the audio file and generating timestamp data corresponding to the visual information associated with the audio file;

initiating play of the desired audio file on an audio playback device; and displaying visual information associated with the desired audio file on a display device separate from said audio playback device in accordance with the timestamp data such that the visual information is displayed synchronously with the playing of the desired audio file, wherein the commencement of playing the desired audio file by the audio playback device and the commencement of the from the display device, and wherein the timestamp data is generated utilizing a text-based process.

12. A method of synchronizing visual information with audio playback, comprising the steps of:
- receiving a user selection of a desired audio file;
- analyzing the audio file and generating timestamp data corresponding to the visual information associated with the audio file;
- initiating play of the desired audio file on an audio playback device; and
- displaying visual information associated with the desired audio file on a display device separate from said audio playback device in accordance with the timestamp data such that the visual information is displayed synchronously with the playing of the desired audio file, wherein the commencement of playing the desired audio file by the audio playback device and the commencement of the displaying step by the display device are a function of a signal from the display device, and wherein the timestamp data is generated utilizing a pronunciation dictionary process.

13. A method of synchronizing visual information with audio playback, comprising the steps of:
- receiving a user selection of a desired audio file;
- analyzing the audio file and generating timestamp data corresponding to the visual information associated with the audio file;
- initiating play of the desired audio file on an audio playback device; and
- displaying visual information associated with the desired audio file on a display device separate from said audio playback device in accordance with the timestamp data such that the visual information is displayed synchronously with the playing of the desired audio file, wherein the commencement of playing the desired audio file by the audio playback device and the commencement of the displaying step by the display device are a function of a signal from the display device, and wherein the timestamp data is generated utilizing a note transcription of music process.

14. A method of synchronizing visual information with audio playback, comprising the steps of:
- receiving a user selection of a desired audio file;
- analyzing the audio file and generating timestamp data corresponding to the visual information associated with the audio file;
- initiating play of the desired audio file on an audio playback device; and
- displaying visual information associated with the desired audio file on a display device separate from said audio playback device in accordance with the timestamp data such that the visual information is displayed synchronously with the playing of the desired audio file, wherein the commencement of playing the desired is audio file by the audio playback device and the commencement of the displaying step by the display device are a function of a signal from the display device, and wherein said method further comprises the steps of:
- comparing a location of a keyword extracted from the desired audio file with an actual location of a keyword within the timestamp data; and
- adjusting the location of the extracted keyword to match the location of the keyword within the timestamp data.

15. An apparatus for synchronizing visual information associated with audio playback, comprising:
- a memory for storing a listing of audio files, and for storing visual information corresponding to said audio files, said visual information containing timestamp data enabling synchronous display of said visual information with audio playback of the corresponding audio file on a separate audio playback device;
- a display device for displaying said visual information; and
- a processor for receiving a user selection of a desired audio file from said stored listing of audio files, for effecting playback of the desired audio file on said separate audio playback device, and for initiating display of the visual information associated with the desired audio file on the display device in accordance with the timestamp data, wherein the commencement of playing the desired audio file by a separate audio playback device and the commencement of the displaying step are a function of a signal from the display device, said signal turning the separate audio playback device off and on prior to the separate audio playback device playing the desired audio file.

* * * * *